United States Patent
Bates et al.

(10) Patent No.: US 7,130,643 B2
(45) Date of Patent: Oct. 31, 2006

(54) METHOD AND SYSTEM FOR SELECTIVELY PAGING A COMMUNICATION DEVICE BASED ON SELF-DETECTED POSITION OF THE COMMUNICATION DEVICE

(75) Inventors: Cary Lee Bates, Rochester, MN (US); Jeffrey Michael Ryan, Byron, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/149,485

(22) Filed: Jun. 9, 2005

(65) Prior Publication Data
US 2005/0227713 A1    Oct. 13, 2005

Related U.S. Application Data

(62) Division of application No. 09/759,784, filed on Jan. 12, 2001, now Pat. No. 6,999,757.

(51) Int. Cl.
*H04Q 7/20* (2006.01)
(52) U.S. Cl. ............... 455/456.1; 455/456.2; 455/456.3; 455/456.5; 455/456.6; 379/204.01
(58) Field of Classification Search ............... 455/417, 455/422, 404.2, 435, 444, 456.1–457, 461, 455/560; 379/204, 210, 211.01, 211.04, 379/212.01
See application file for complete search history.

(56) References Cited

U.S. PATENT DOCUMENTS

| | | | |
|---|---|---|---|
| 5,222,123 A | | 6/1993 | Brown et al. |
| 5,235,633 A | | 8/1993 | Dennison et al. |
| 5,315,636 A | * | 5/1994 | Patel ...................... 379/201.07 |
| 5,367,558 A | * | 11/1994 | Gillig et al. ............. 455/426.1 |
| 5,502,762 A | | 3/1996 | Andrew et al. |
| 5,745,850 A | | 4/1998 | Aldermeshian et al. |
| 5,757,902 A | | 5/1998 | Mitsuo |
| 5,778,304 A | | 7/1998 | Grube et al. |
| 5,845,207 A | | 12/1998 | Amin et al. |
| 5,903,833 A | | 5/1999 | Jonsson et al. |

(Continued)

FOREIGN PATENT DOCUMENTS

EP    0865188 A2    9/1998

(Continued)

OTHER PUBLICATIONS

Anonymous: "Mobile Telephone with Position Reporting System", Research Disclosure, Kenneth Mason Publications, Hampshire, GB, vol. 41, No. 410, Jun. 1, 1998, XP002170406.

*Primary Examiner*—Steve M. D'Agosta
(74) *Attorney, Agent, or Firm*—Martin & Associates, LLC; Derek P. Martin (57) ABSTRACT

A portable phone is equipped with a position detector that detects the geographical position of the portable phone, and a telephone system may ring one or more land-based phones or portable phones according to the geographical position of the portable phone. One or more geographical regions are defined, with corresponding telephone parameters defined for each region. When a portable phone enters a defined region, exits a defined region, or changes between two defined regions, the function of one or more land-based phones or portable phones may change. The preferred embodiments thus allow changing the function of one or more other phones based on the self-detected geographical position of a portable phone. In this manner the convenience of using portable phones is greatly enhanced.

2 Claims, 10 Drawing Sheets

U.S. PATENT DOCUMENTS

| | | |
|---|---|---|
| 6,038,451 A | 3/2000 | Syed et al. |
| 6,141,556 A | 10/2000 | Dougherty et al. |
| 6,195,558 B1 | 2/2001 | Griffith et al. |
| 6,253,088 B1 | 6/2001 | Wenk et al. |
| 6,320,534 B1 * | 11/2001 | Goss ................... 342/357.1 |
| 6,405,041 B1 | 6/2002 | Mukerjee et al. |
| 6,459,695 B1 | 10/2002 | Schmitt |
| 6,603,973 B1 * | 8/2003 | Foladare et al. ............ 455/445 |
| 7,006,833 B1 * | 2/2006 | Contractor ............... 455/456.1 |

FOREIGN PATENT DOCUMENTS

| | | |
|---|---|---|
| EP | 0876070 A1 | 11/1998 |
| EP | 0876071 A1 | 11/1998 |
| JP | 08-186647 | 7/1996 |
| JP | 09-191494 | 7/1997 |
| JP | 09-247749 | 9/1997 |
| JP | 11018159 | 1/1999 |
| JP | 11-331948 | 11/1999 |
| US | EP0876071 A * | 4/1998 |
| WO | WO9933199 | 7/1999 |

* cited by examiner

Phone Parameters 800

| Region | Allowed #s | Current #s |
|---|---|---|
| Home | 555-0011<br>855-1234 | 555-0011<br>855-1234 |
| Work | 555-2233<br>855-1234 | 555-2233 |

METHOD AND SYSTEM FOR SELECTIVELY PAGING A COMMUNICATION DEVICE BASED ON SELF-DETECTED POSITION OF THE COMMUNICATION DEVICE

REFERENCE TO PARENT APPLICATION

This patent application is a divisional of the patent application "TELEPHONE SYSTEM AND METHOD FOR SELECTIVELY RINGING ONE OR MORE LAND PHONES OR PORTABLE PHONES BASED ON THE SELF-DETECTED GEOGRAPHICAL POSITION OF A PORTABLE PHONE", Ser. No. 09/759,784 filed by Bates et al. on Jan. 12, 2001, now U.S. Pat. No. 6,999757 which is incorporated herein by reference.

BACKGROUND OF THE INVENTION

1. Technical Field

This invention generally relates to telephone systems and more specifically relates to portable phones.

2. Background Art

Since Alexander Graham Bell uttered those famous words "Mr. Watson—come here—I want to see you", the telephone has evolved into a necessity of modern living. Land-based telephone systems are the most ubiquitous, and have been found in most homes and businesses in the United States for many decades. Recently, wireless phones have gained in popularity. Wireless phones include cellular phones, digital phones, satellite phones, etc. For the purpose of discussion herein, the term "portable phone" applies to any and all types of wireless phones, whether now known or developed in the future.

Known portable phones are like land-based phones in the respect that they ring when the number that is assigned to the portable phone receives a call. Portable phones currently cannot affect the function of other portable phones or of land-based phones. Modern life makes it desirable for the location of a portable phone to affect how other land-based phones or other portable phones function. For example, when a user of a portable phone takes the phone home, it may be desirable for a call to the portable phone to ring the user's home phone instead, thereby avoiding wireless charges during the call. Without a way for a portable phone to change the function of other phones based on its geographical position, the power of using portable phones will not fully be realized.

DISCLOSURE OF INVENTION

According to the preferred embodiments, a portable phone is equipped with a position detector that detects the geographical position of the portable phone, and a telephone system may ring one or more land-based phones or portable phones according to the geographical position of the portable phone. One or more geographical regions are defined, with corresponding telephone parameters defined for each region. When a portable phone enters a defined region, exits a defined region, or changes between two defined regions, the function of one or more land-based phones or portable phones may change. The preferred embodiments thus allow changing the function of one or more other phones based on the self-detected geographical position of a portable phone. In this manner the convenience of using portable phones is greatly enhanced.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Throughout history, the telephone has been an important device for communicating the need for emergency services. The phrase "Operator, get me the police!" has been used in many Hollywood movies. Land-based telephone systems have evolved to include emergency systems known as "911" systems that catalog the location of each telephone along with its telephone number. Modern land-based telephone systems communicate an identifier when placing a call, often referred to as a "caller ID". When a person calls 911 from a land-based phone, the 911 computer system automatically detects the caller ID, and displays the caller's location from its database. This allows emergency vehicles to be dispatched even if the caller is unable to speak or identify his or her location.

Retrieving the location of a land-based phone when a person calls 911 is a simple task because the location of the phone does not change over time. However, with portable phones, there is currently no "911" equivalent system that allows emergency vehicles to be dispatched to the portable phone's location, because the location constantly changes. In one case in South Dakota, a woman ran her car into a ditch during a blizzard. She called the police on her cellular phone and said she had no idea where she was located. Over the next several hours, she called in several times for a few minutes at a time (to preserve her phone's battery life) while emergency services personnel worked with the cell phone company to locate the woman's phone based on a well-known technique known as "triangulation" of her cell phone signal. After several hours, her location was identified with enough certainty to allow emergency workers to find her. While this outcome was a happy one, it is clear that many people who have emergencies do not have hours to wait for help to arrive. This case illustrates the need for a 911-type of system for portable phones. If a person is having a heart attack, that person may well be dead in a few minutes if medical help is not received immediately. For this reason the Federal Communications Commission has mandated that portable phone providers implement an Enhanced 911 (E911) system by the end of the year 2001.

One way to implement an enhanced 911 system for portable phones is to place a position detector in each phone that communicates the position of the phone to the portable phone service provider. One popular type of position detector is a Global Positioning System (GPS) detector that detects its geographical position based on signals received from several satellites. A press release dated Aug. 10, 1998 at www.sirf.com/as_pr13.htm states that Nokia, one of the leading manufacturers of portable phones, invested in the GPS technology of SiRF Technology, Inc. to allow putting SiRF's GPS detectors into Nokia phones in order to meet the FCC mandate for an E911 system.

While the prior art suggests placing a GPS detector in a portable phone, this teaching is for the purpose of implementing an E911 system, as described above. An E911 system can be implemented by communicating the location of the phone to the cell phone provider without changing the apparent function of the portable phone or other phones. The preferred embodiments described herein use the position information from an on-board position detector (e.g., GPS detector) to change the function of the portable phone or other phones according to one or more geographical regions defined by the user. In this manner a portable phone may make other phones selectively ring or not ring without intervention by a user as the position of the portable phone enters or exits a defined region.

Figure 1:
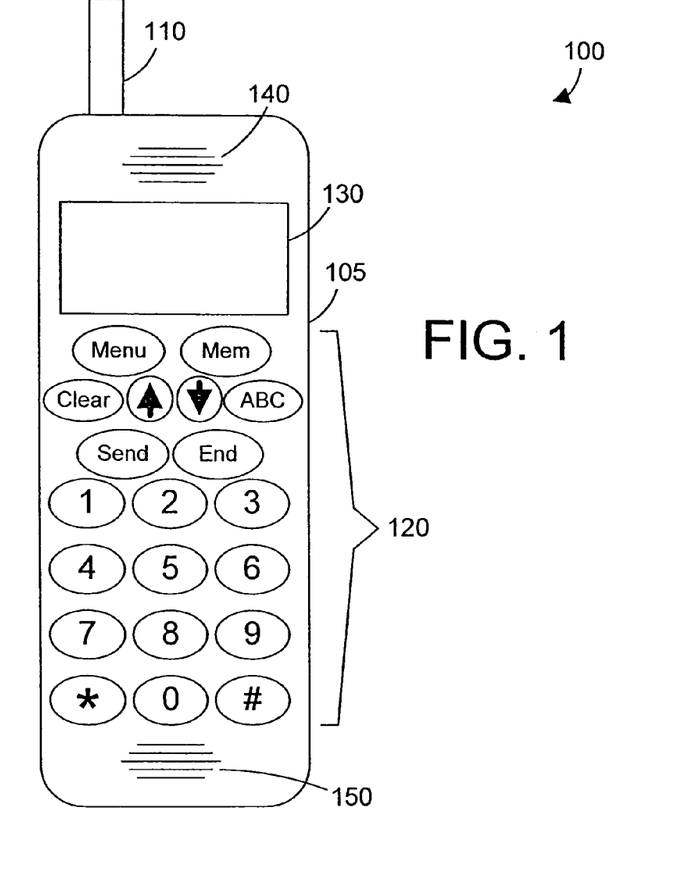
FIG. 1 is a diagram of a portable phone in accordance with the preferred embodiments.

Referring now to FIG. 1, a portable phone 100 in accordance with the preferred embodiments includes a case 105. Within or attached to case 105 are antenna 110, keypad 120, display 130, speaker 140, and microphone 150. Antenna 110 is a standard antenna as is known in the art for allowing portable phone 100 to communicate with its service provider in placing and receiving calls. Keypad 120 includes the traditional ten numerals, star, and pound key found on most telephone keypads. In addition, keypad 120 includes a "Send" key for placing a call, an "End" key for terminating a call, a "Clear" key for clearing a portion of the display 130, a "Menu" key for displaying a menu on the display 130, up arrow and down arrow keys for scrolling through menus and lists on the display 130, a "Mem" key (short for "memory") that displays information stored in phone 100, and an "ABC" key that changes the ten numeral keys from numeric input to alpha character input. It is well known in the art that the 2 through 0 numeral keys on standard telephones include most of the alphabet characters. For the sake of clarity in the drawing, the alpha characters associated with numeral keys 2 through 0 are not shown. By pressing the "ABC" key, the phone enters an alpha input mode that allows inputting text information into phone 100 via keypad 120 that can be displayed on display 130. The keys on keypad 120 in FIG. 1 are shown by way of example, and many different keys not explicitly shown may be substituted or added within the scope of the preferred embodiments.

Display 130 is preferably a backlit liquid crystal display (LCD) that includes multiple lines of alphanumeric display capability. Speaker 140 is a small, low-power speaker as is known in the art for portable phones. In addition, microphone 150 is a small, low-power microphone as is known in the art for portable phones.

Figure 2:
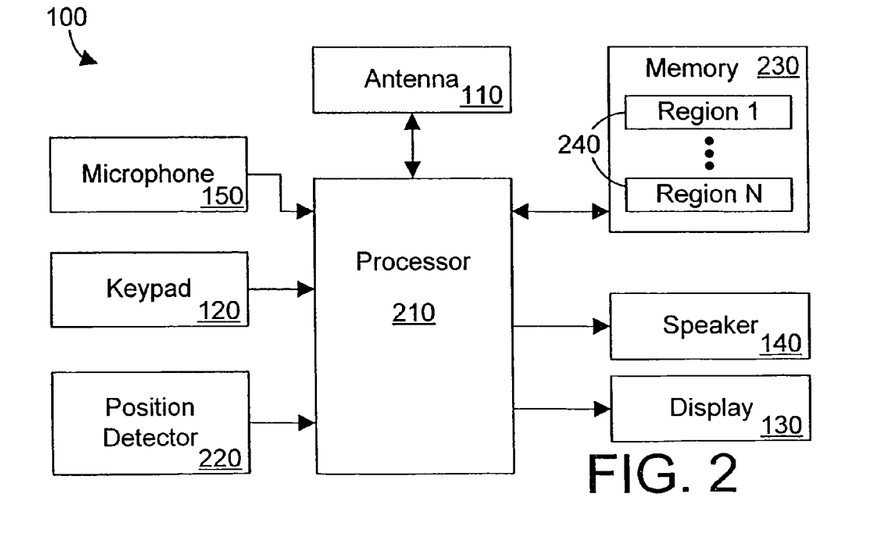
FIG. 2 is a block diagram of components in the portable phone of FIG. 1.

The components of FIG. 1, except for case 105, are shown in the block diagram of FIG. 2. The keypad 120 and microphone 150 are input devices, the display 130 and speaker 140 are output devices, and antenna 110 is both an input and an output device. Portable phone 100 includes a processor 210 that is coupled to the antenna 110, keypad 120, display 130, speaker 140, and microphone 150. In addition, processor 210 is also coupled to a position detector 220 and to a memory 230. Position detector 220 is an electronic device that provides its geographical position to processor 210, preferably in longitude and latitude coordinates. In the preferred embodiments, position detector 220 is a global positioning system (GPS) detector. Memory 230 may include any combination of volatile and non-volatile memory, and preferably includes one or more defined geographical regions 240. Processor 210 takes input from keypad 120, microphone 150, position detector 220, antenna 110, and memory 230, and generates appropriate output on display 130, speaker 140, antenna 110, and memory 230. Note that the block diagram of FIG. 2 does not include many components or features known in prior art portable phones. FIG. 2 is a simple diagram showing only the most commonly-known components and features that allow a complete description of the preferred embodiments of the present invention. Of course, portable phone 100 could also include any component or feature that is known in the art in addition to those shown within the scope of the preferred embodiments.

Figure 3:
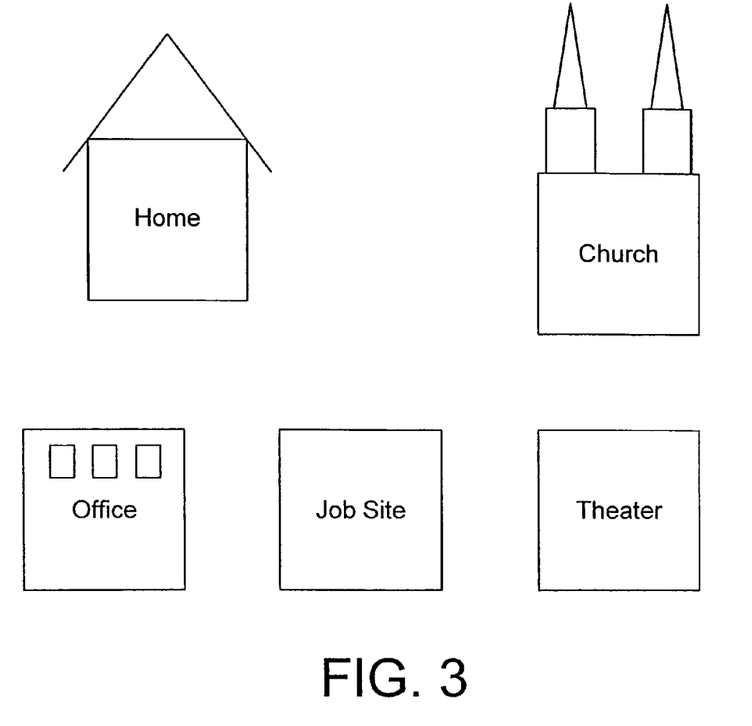
FIG. 3 is a diagram showing different regions that may be defined for the portable phone of FIGS. 1 and 2.

FIG. 3 illustrates different geographical regions that a user may want to define in order to alter the function of a telephone system according to whether or not a portable phone is in a defined region. For example, we assume that an architect is the user of a portable phone in accordance with the preferred embodiments, and wants to program her phone for the five different regions shown in FIG. 3: home, church, office, job site, and theater. These regions are shown by way of example, and the preferred embodiments expressly extend to the definition of any suitable geographical region.

Figure 4:
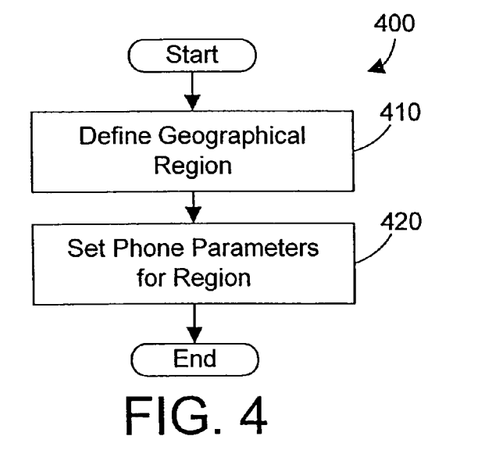
FIG. 4 is a flow diagram showing the steps in defining one or more geographical regions and in defining phone parameters for each defined geographical regions.

Referring to FIG. 4, a method 400 shows the steps in defining regions and setting phone parameters for each region. First, a geographical region is defined (step 410). Next, phone parameters are set for this newly-defined region (step 420). Method 400 is repeated for each region that needs to be defined, thus creating phone parameters for each region that are independent of the phone parameters of other regions. Once the desired geographical regions and the corresponding phone parameters are defined, a telephone system will function differently according to the detected geographical position of a portable phone.

Step 410 in FIG. 4 allows the user to define a geographical region of interest. There are numerous ways for the user to define a geographical region. As stated above, the preferred implementation of position detector 220 in FIG. 2 is a GPS detector. If position detector 220 is a GPS detector, the geographical region must be defined in GPS coordinates. With the proliferation of GPS detectors, it may well be that a user may be able to consult a database to retrieve GPS coordinates for a given location. For example, a mapping company may provide a web site that provides GPS coordinates for any selected region on a map. A user could then enter these coordinates into portable phone 100 using keypad 120 and display 130 to define a region. In the alternative, a company may offer a service that allows a user to call the company using the portable phone 100, which then communicates to the service an identifier for the region of interest (such as an address), and the service could then download GPS coordinates for the region of interest into portable phone 100. Another way for a user to define a geographical region in step 410 of FIG. 4 takes advantage of the on-board position detector 220 within portable phone 200 to allow a user to dynamically define a region of interest. The dynamic creation of a geographical region of interest is explained below with reference to FIG. 5. The preferred embodiments expressly extend to all mechanisms and methods for defining a geographical region, whether currently known or developed in the future.

Figure 5:
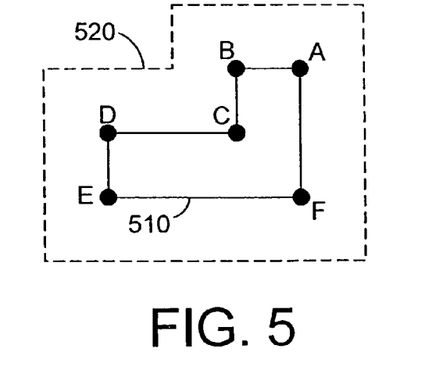
FIG. 5 is a diagram showing how a region may be dynamically defined in accordance with the preferred embodiments.

We assume for the sake of illustration that the architect's office in FIG. 3 is located within an L-shaped office building, the outline of which is shown as 510 in FIG. 5. The architect can dynamically define the geographical region corresponding to her office building by placing the portable phone in a menu-driven "region definition" mode that prompts the user to perform certain actions to define a region. When the "region definition" mode is entered, the display 130 prompts the user to travel to the location of a corner (i.e., boundary point) of the region and press a key (such as the # key). In the example of FIG. 5, we assume that the user puts her portable phone 100 into "region definition" mode, then walks to point A that corresponds to a corner of building 510. The user then presses the # key, which causes processor 210 to read the current geographical position of the portable phone from the position detector 220 and store this coordinate in memory 230. The user then travels to point B, and presses the # key again, causing the processor 210 to get a new position from position detector 220 and store the coordinate in memory 230. The user then travels to points C, D, E and F, pausing each time to press the # key to store the current position as a boundary point of the region. After pressing the # key at point F, the user then presses another key (such as the "End" key) to instruct the processor 210 to compute a region based on the entered corner points. Processor 210 takes each boundary point and effectively "connects the dots" to generate a region of interest. By allowing a user to dynamically define regions of interest using the position detector 220 within the portable phone 100, the user does not need to access any position information in any database when defining regions of interest.

Note that a GPS detector reading is only accurate to within a specified tolerance. For this reason, after constructing the region 510 in FIG. 5, the region may be enlarged by the amount of the tolerance, as shown as 520 in FIG. 5. Expanding the region by the amount of allowable tolerance assures that any reading taken within the building will be detected as lying within the defined region.

Another method for dynamically defining a region is to press a key that causes the processor 210 to get the current position from position detector 220, and then press one or more keys to specify a radius for defining a circular region. This is a much simpler way of defining a region if a circle can adequately approximate that region that needs to be defined. For example, if a person lives in a house, they may dynamically define a home zone by going to the approximate center of the house, pressing a key to enter the position at that point, and entering a radius of 50 feet. This is a much simpler way of defining a region if a circle can adequately approximate that region that needs to be defined.

Figure 6:
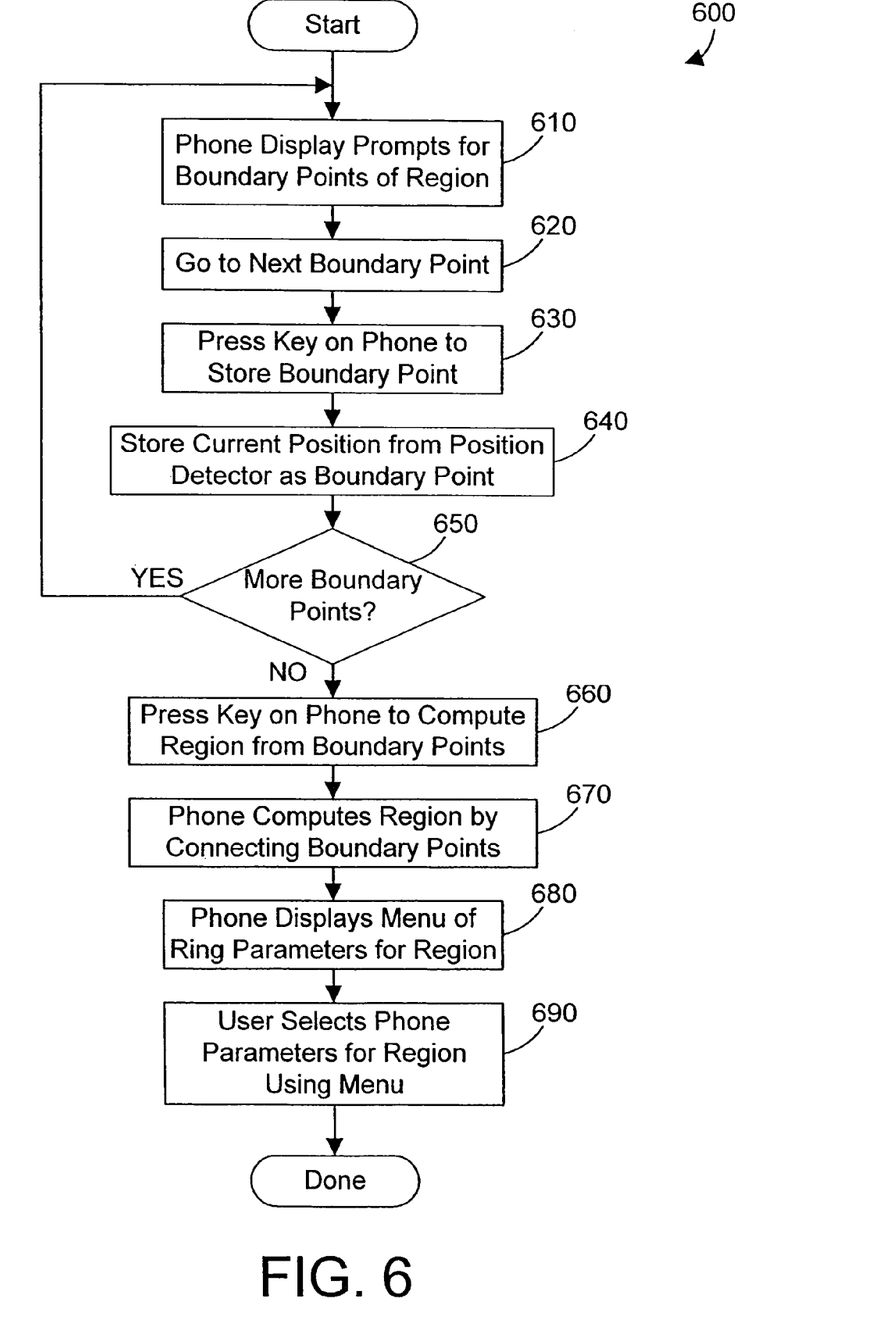
FIG. 6 is a flow diagram that shows one specific implementation of method 400 of FIG. 4 for dynamically defining a region and defining phone parameters for each defined geographical region.

Referring now to FIG. 6, a method 600 illustrates one specific implementation of method 400 of FIG. 4 that allows a user to dynamically define a region of interest as explained above with reference to FIG. 5, and to define phone parameters for the region of interest. First, the phone display prompts for boundary points of the region (step 610). The user then goes to a boundary point (step 620) and presses a key on the phone to store the boundary point (step 630). The phone then stores the current position read from the position detector 220 as a boundary point (step 640). If there are more boundary points to define (step 650=YES), steps 610–640 are repeated until all boundary points have been entered (step 650=NO). At this point a different key is pressed on the phone to compute the region from the stored boundary points (step 660). The phone computes the region by connecting the boundary points (step 670). The phone then displays a menu of phone parameters to the user (step 680). The user selects the phone parameters for the newly-defined region using the menu and keypad 120. Note that for this particular implementation, steps 610–670 correspond to step 410 in FIG. 4, and steps 680–690 corresponds to step 420 in FIG. 4. Method 600 thus allows a user to dynamically define a region, then set the corresponding phone parameters for that region.

Note that the term "phone parameters" is a broad term that encompasses any information that may affect the ringing of phones or routing of calls based on the geographical location of a portable phone. For example, phone parameters may include an indication of land-based phones to ring when a portable phone is within or outside of a defined region. Phone parameters may include an indication of whether to ring a single phone or multiple phones when a portable phone is within or outside of a defined region. Phone parameters may include an indication of whether to ring a portable phone that is within or outside of a defined region when a land-based phone or another portable phone within the region rings. These examples are provided to simply illustrate that the term "phone parameters" includes any information that may affect the ringing or routing of calls based on the self-detected geographical location of a portable phone.

Figure 7:
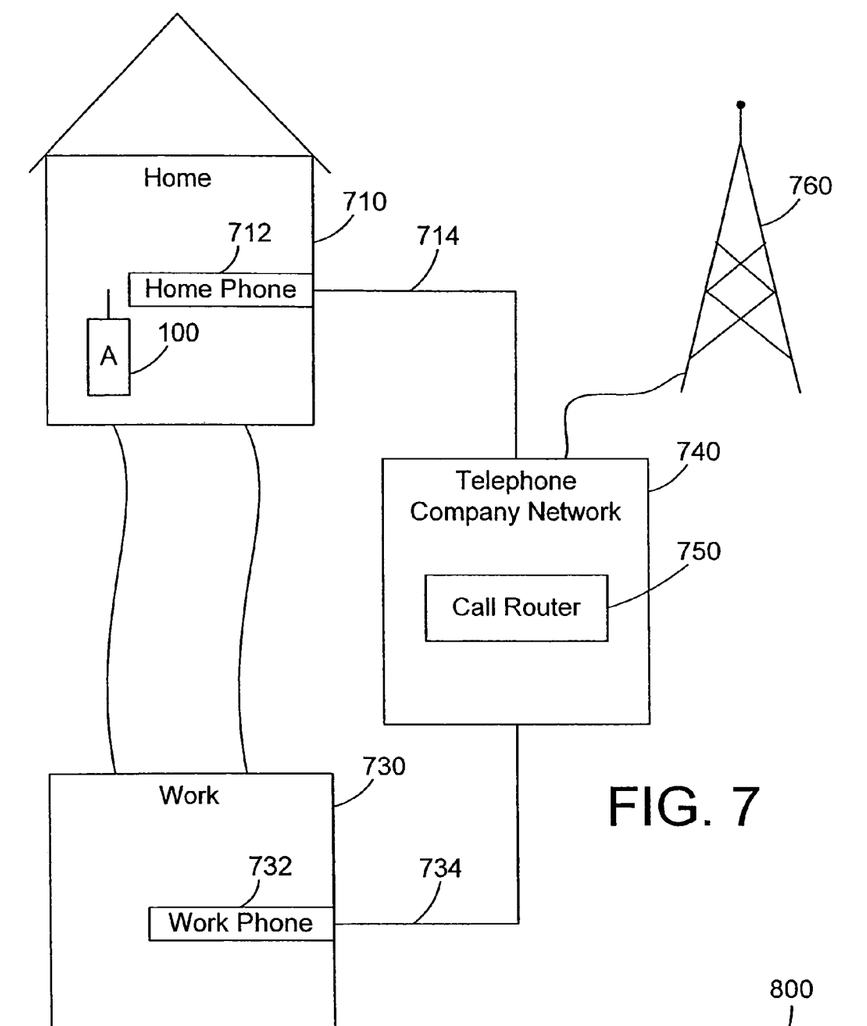
FIG. 7 is a block diagram of a sample configuration in accordance with the preferred embodiments that allows selectively ringing two land-based telephones depending on the self-detected geographical position of a portable phone, with the portable phone at home.

FIG. 7 shows one sample configuration that is useful in illustrating the concepts of the preferred embodiments. We continue with our example above relating to an architect who lives in a home 710 and works in an office 730. At home, the architect has a home phone 712 that is a land-based phone that is coupled via a wire connection 714 to a telephone company network 740, as is known in the art. Similarly, the architect has a work phone 732 at her office 730 that is also a land-based phone that is coupled via a wire connection 734 to the telephone company network 740. Note that telephone company network 740 includes a call router 750 that ring phones and routes calls according to the geographical position of a portable phone 100, shown in FIG. 7 to be at home 710. Telephone company network 740 is also coupled to a mechanism for communicating with portable phones, shown in FIG. 7 as a cellular phone tower 760. The specific example of FIG. 7 assumes that a telephone company network 740 that provides local telephone service is also a service provider for portable phones. This assumption is made for the purpose of illustrating the preferred embodiments, which expressly extend to any and all configurations and combinations of telephone networks and companies that are needed to communicate with both land-based telephones and portable telephones.

Figure 8:
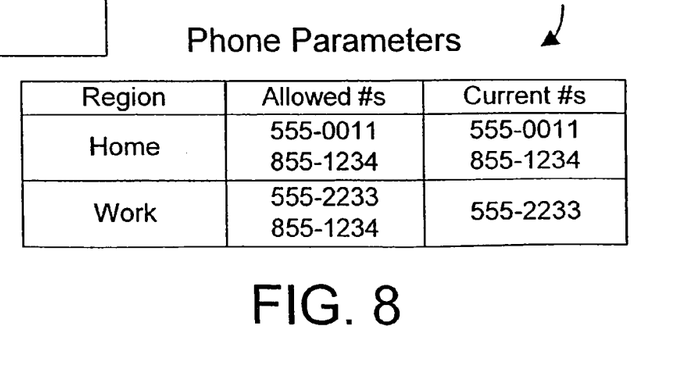
FIG. 8 is a block diagram of sample phone parameters for the sample configuration of FIG. 7.

Suitable phone parameters 800 for the example of FIG. 7 are shown in FIG. 8. We assume for this simple example that a region is defined that corresponds to the architect's home 710, and a separate region is defined that corresponds to the architect's office 730. Phone parameters 800 shown that each defined region has a list of allowed phone numbers that are allowed to be affected by the presence or absence of portable phone 100 within a region. Each region also has a list of current phone numbers whose operation may be affected by the presence or absence of portable phone 100 within a region. For the simple example in FIGS. 7 and 8, we assume the following: portable phone 100 has a telephone number of 855-1234; home phone 712 has a telephone number of 555-0011; and work phone 732 has a telephone number of 555-2233. The entry in phone parameters 800 for home indicates that both the home phone number and the portable phone number are allowed numbers, and that both of these are current numbers, because the portable phone is at home. For this specific example, we assume when the portable phone is at home 710 that a call to either the home phone 710 or the portable phone 100 will cause the call router 750 to ring both phones 712 and 100, and the call router 750 will then connect the call to whichever phone is answered first. Of course, other variations are also possible within the scope of the preferred embodiments. For example, when the portable phone 100 is at home 710, the call router 750 could route calls to the portable phone 100 to the home phone 712 without the portable phone 100 ringing, while the call router routes calls to the home phone 712 only to the home phone, and not to the portable phone 100. These types of variations could be easily programmed into the phone parameters that dictate the function of the portable phone and other phones according to the self-detected geographical position of the portable phone.

Figures 9, 10:
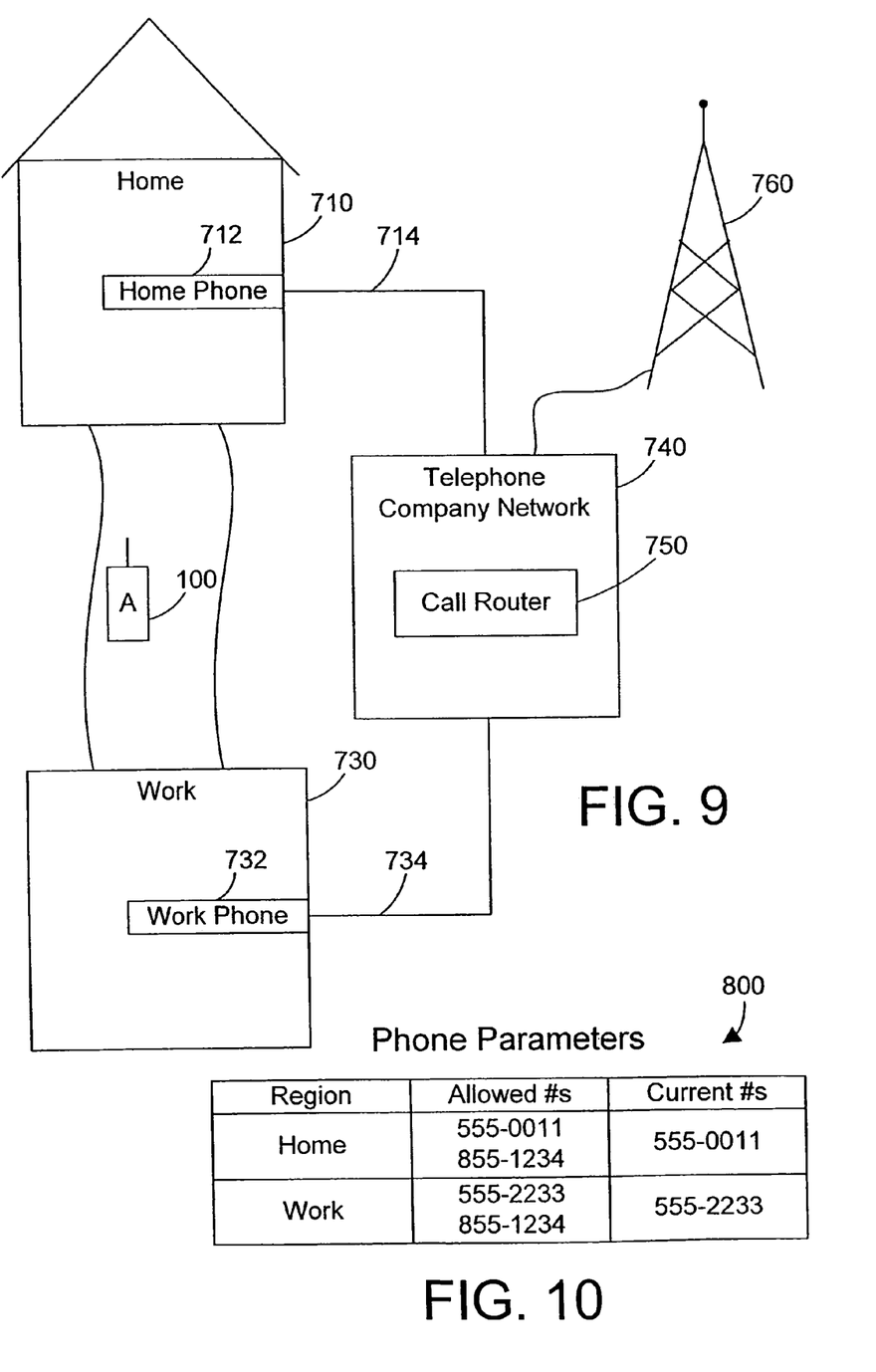
FIG. 9 is a block diagram of the sample configuration of FIG. 7 with the portable phone between home and work.
FIG. 10 is a block diagram of sample phone parameters for the sample configuration of FIG. 9.

Note that the phone parameters 800 shown in FIG. 8 for the defined "work" region show that both the work phone number and the portable phone number are allowed numbers, but only the work phone number is a current number because the portable phone 100 is not at work 730. We now assume that the architect leaves home 710 with the portable phone 100 to begin the journey to work 730. This situation is shown in FIG. 9, where the portable phone 100 is located somewhere between home 710 and work 730. Phone parameters 800 in FIG. 10 now indicate that the phone number for the portable phone (855-1234) is not a current number for either the home region or the work region, because the portable phone 100 is not located within either of these regions. As a result, the call router 750 will route a call to the home phone 712 to only the home phone; will route a call to the work phone 732 only to the work phone; and will route a call to the portable phone 100 only to the portable phone. Thus, the operation of the telephone system for the specific example in FIG. 9 is the same as in the prior art when the portable phone 100 is not in any defined region.

Figures 11, 12:
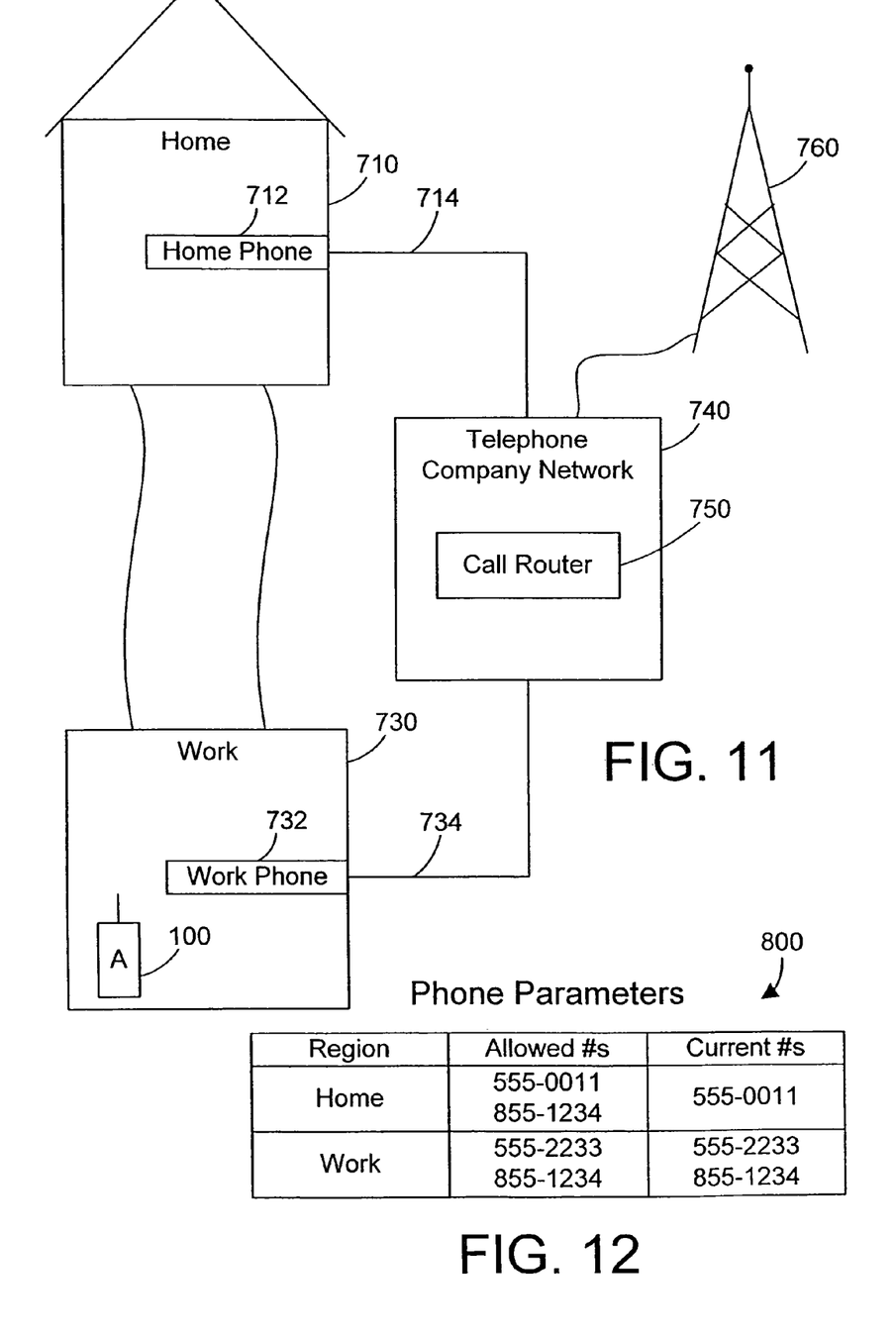
FIG. 11 is a block diagram of the sample configuration of FIG. 7 with the portable phone at work.
FIG. 12 is a block diagram of sample phone parameters for the sample configuration of FIG. 11.

Referring now to FIG. 11, the architect now arrives at work 730 with her portable phone 100. Because the portable phone 100 is now within a defined zone (i.e., work) where it is an allowed number, the portable phone number 855-1234 is added to the current number list for the work region, as shown in FIG. 12. The call router 750 will now ring both portable phone 100 and work phone 732 when a call is received for either of these phones, and will connect the call to the phone that is answered first. Of course, variations are possible as discussed above that allow different functions according to the presence or absence of portable phone 100 in any defined region.

This simple example in FIGS. 7–12 illustrates the general principle of affecting the operation of a telephone system according to the geographical position of a portable phone. The preferred embodiments expressly extend to any change in the operation of a telephone system as a result of the self-detected geographical position of a portable phone. Suitable changes in operation include (without limitation) selectively ringing or not ringing one or more land-based phones or portable phones based on the geographical position of a portable phone. Of course, other changes in operation are also within the scope of the preferred embodiments.

Figure 13:
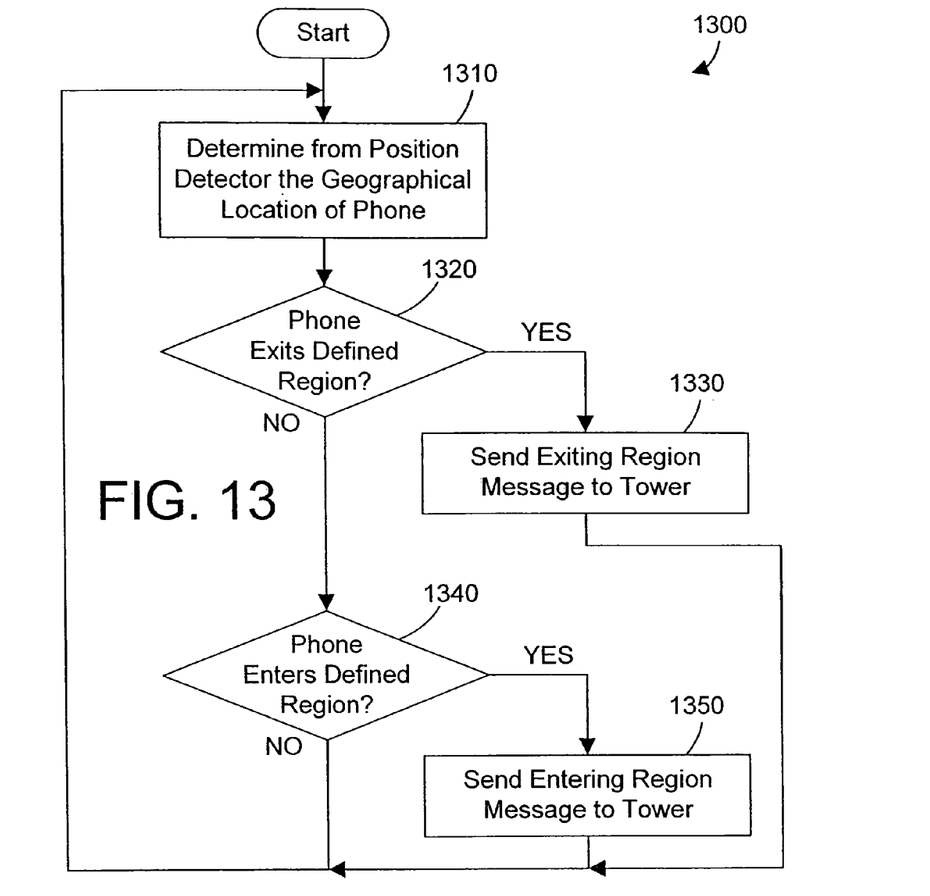
FIG. 13 is a flow diagram of a method for a portable phone to send messages when defined regions are entered and exited.

There are different ways for a telephone system to handle changes in a portable phone's geographical position within the scope of the preferred embodiments. In one specific example, the portable phone contains the defined geographical regions, and the phone simply reports to the telephone company network 750 whenever the portable phone enters or exits a defined region. Referring to FIG. 13, a method 1300 shows the steps performed by a portable phone to report changes to its self-detected geographical position as it enters and exits defined geographical regions. Method 1300 begins by determining from a position detector in a portable phone the geographical location of the phone (step 1310). If the phone exits a defined region (step 1320=YES), the portable phone sends a message to its communication tower (e.g., tower 760 of FIGS. 7, 9 and 11) that it has exited a defined region (step 1330) while identifying to the tower the name of the exited region. If the phone enters a defined region (step 1340=YES), the portable phone sends a message to its communication tower that it has entered a defined region (step 1350) while identifying to the tower the name of the entered region. In this manner the portable phone reports as it enters or exits defined regions. Note that method 1300 imposes upon the portable phone the task of keeping track of the boundaries of a region. The telephone company network 740 only has to keep track of names of regions without having any idea where these regions lie. Note also that if two regions share a boundary, and the portable phone crosses the boundary, the portable phone will send two messages, one to indicate the exit from one region and the other to indicate the entrance to the other defined region. Of course, these two messages could be combined into a single message within the scope of the preferred embodiments.

Figure 14:
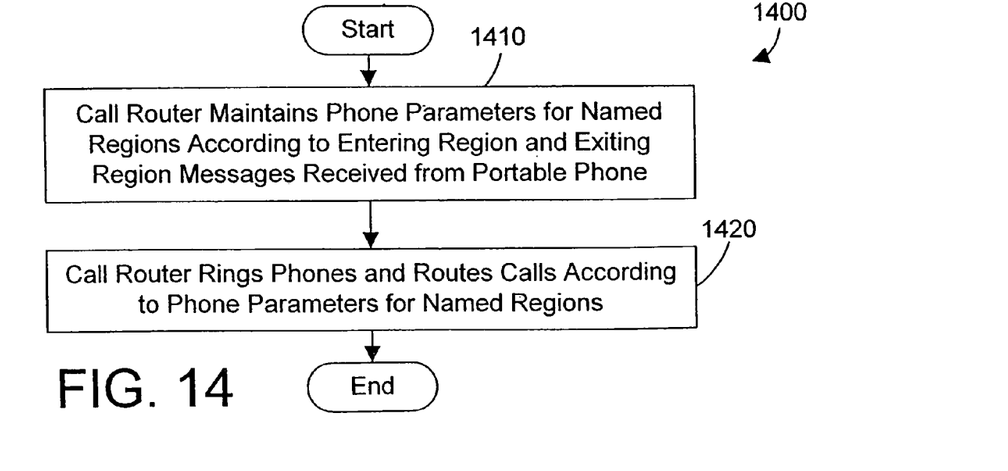
FIG. 14 is a flow diagram of a step for a telephone system to maintain phone parameters for named regions as entering region and exiting region messages are received from a portable phone (such as when steps 1330 and 1350 of FIG. 13 are performed)

Referring to FIG. 14, a method 1400 represents the function of a telephone company network that receives the exiting region and entering region messages from method 1300 in FIG. 13. The call router (e.g., 750 of FIGS. 7, 9 and 11) maintains phone parameters for the named regions according to the entering region and exiting region messages received from the portable phone (step 1410). For the simple example of FIGS. 7–12, the call router simply looks to the current number list for the region to determine which phones to ring when a call is received on the home or work numbers. If the portable phone is listed as a current number, it will ring in addition to ringing the land-based phone that corresponds to the dialed number.

Figure 15:
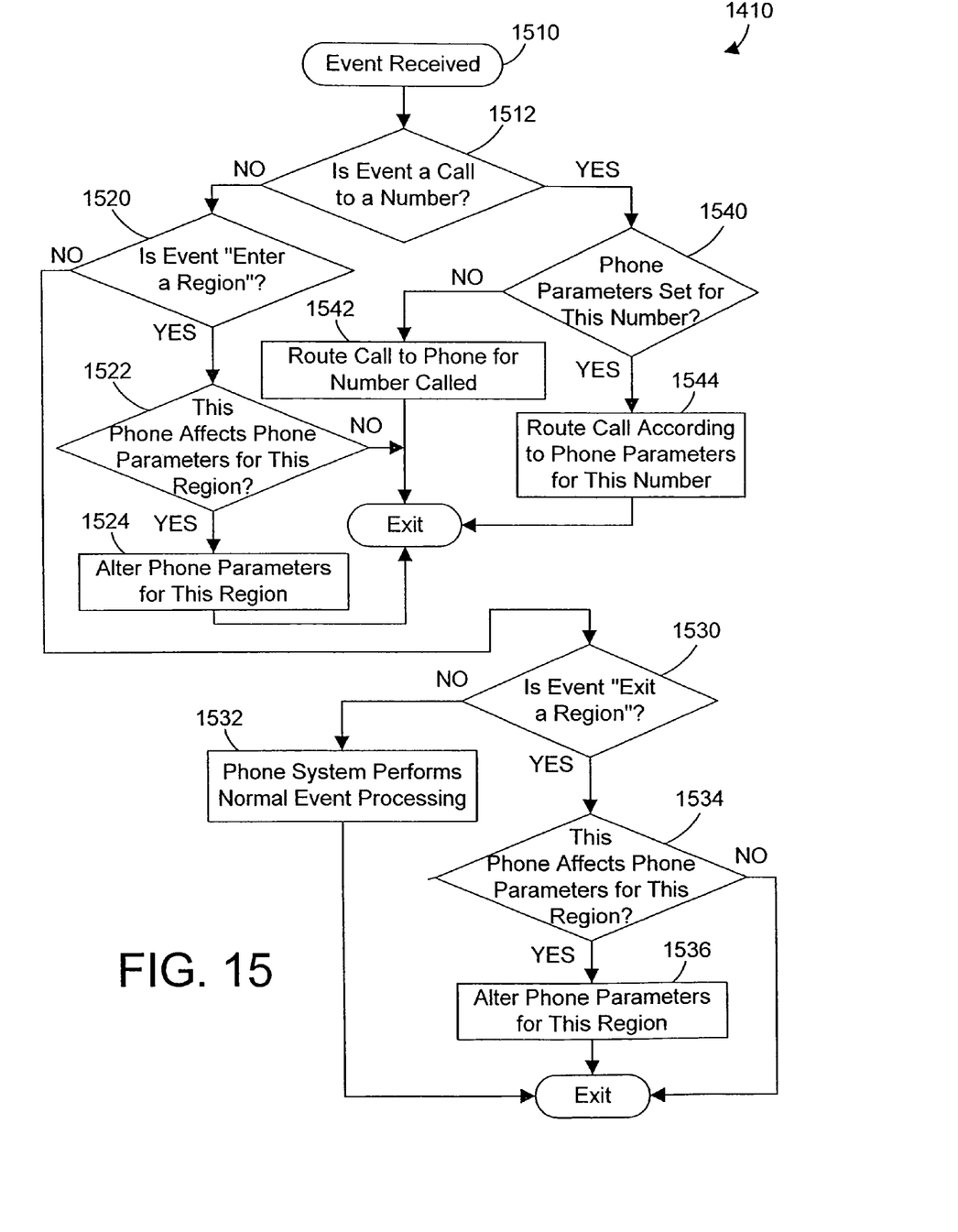
FIG. 15 is a flow diagram of one specific implementation of step 1410 of FIG. 14 in accordance with the preferred embodiments.

One specific implementation for step 1410 in FIG. 14 is shown as method 1410 in FIG. 15. We assume that this method 1410 commences when an event is received by the telephone company network that needs to be processed (step 1510). If the event is a call to a number (step 1512=YES), and if phone parameters are set (or defined) for the called number (step 1540=YES), the call is routed according to the phone parameters for this number (step 1544). If no phone parameters are set for the called number (step 1540=NO), the call is routed to the number called, as is normally done in the prior art (step 1542). If the event is not a call to a number (step 1512=NO), method 1410 checks to see if the event is an "enter a region" event (step 1520). For the example of FIG. 13, an "enter a region" event occurs when a portable phone sends an entering region message to its tower, as occurs in step 1350. If the event is an "enter a region" event (step 1520=YES), we see if the presence of the portable phone in this region affects the phone parameters for this region (step 1522). If not (step 1522=NO), method 1410 exits. If the presence of the portable phone in this region affects the phone parameters (step 1522=YES), the phone parameters for this region are altered (step 1524) to change the way that a call is routed due to the presence of the portable phone in the region.

If the event is not an "enter a region" event (step 1520=NO), we next look to see if the event is an "exit the region" event (step 1530). For the example of FIG. 13, an "exit a region" event occurs when a portable phone sends an exiting region message to its tower, as occurs in step 1330. If the evens is not an "exit the region" event (step 1530=NO), the event is some other event (such as a normal event that the telephone company network would handle in the prior art), and the phone system performs normal event processing (step 1532) as would be normally done in the prior art. If the event is an "exit the region" event (step 1530=YES), we see if the absence of the portable phone in this region affects the phone parameters for this region (step 1534). If not (step 1534=NO), method 1410 exits. If the absence of the phone in the region just exited affects the phone parameters for the region just exited (step 1534=YES), the phone parameters for the region just exited are altered (step 1536). Method 1410 as illustrated in FIG. 15 thus alters the phone parameters as a portable phone enters a defined region and exits a defined region, thereby changing the way a call router (e.g., call router 750) rings phones and connects calls.

The methods in FIGS. 13–15 assume that the portable phone keeps track of the defined regions, and simply sends messages to the telephone company network as the portable phone detects from its internal position sensor that it enters or exits a defined region. As stated above, this approach relieves the telephone company network of the task of tracking the location of the portable phone and determining whether the present location of the portable phone is within or without its defined regions. An alternative method of accomplishing similar function is to have the portable phone simply report its geographical position periodically, and to have the regions defined within the telephone company network. The call router could then alter how telephones are rung and how calls are routed according to the position of the portable phone when compared to the defined regions and their corresponding phone parameters. This alternative method is represented in FIGS. 16 and 17.

A method 1600 for a portable phone in accordance with the preferred embodiments begins by determining from the position detector the geographical location of the portable phone (step 1610). The geographical location information is then transmitted to the tower (step 1620). In this manner the telephone company network coupled to the tower can track the movement of the portable phone, and can determine whether the ringing of a phone or routing of a call should be altered due to the presence or absence of a portable phone in any defined region.

Figure 16:
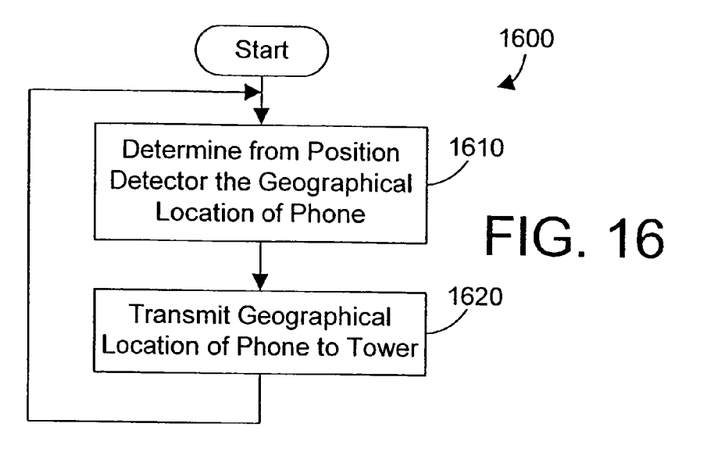
FIG. 16 is a flow diagram of a method for a portable phone to transmit geographical location information to a telephone company network.
Figure 17:
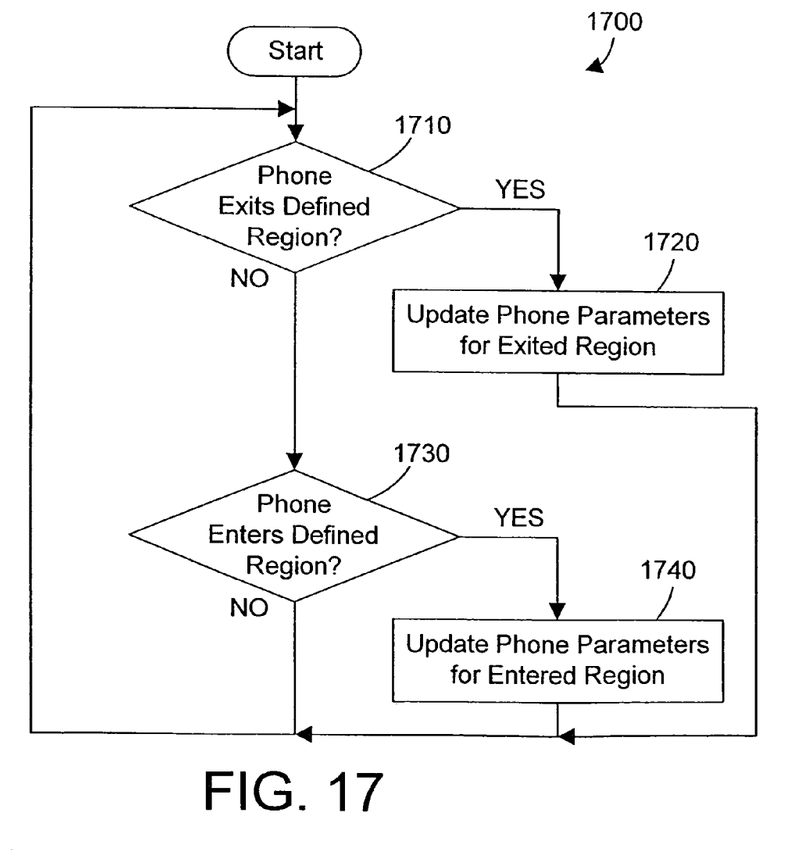
FIG. 17 is a flow diagram of a method for a telephone company network to process the geographical location information transmitted in step 1620 of FIG. 16 to determine whether the portable phone exits or enters a defined region.

A method 1700 shows the steps performed by the telephone company network when it receives the geographical location of a portable phone from step 1620 in FIG. 16. This configuration assumes that the call router knows the geographical boundaries for each defined region, and can thus track when a portable phone enters or exits any defined region. If the geographical location of a portable phone indicates that it has exited a defined region (step 1710=YES), the phone parameters for the exited region are then updated to reflect that the portable phone is no longer present within the exited region (step 1720). If the geographical location of a portable phone indicates that it has entered a defined region (step 1730=YES), the phone parameters for the entered region are updated to reflect that the portable phone is present within the entered region (step 1740). In this manner the call router keeps track of the defined regions, and updates the phone parameters for each region as portable phones enter or exit each defined region. The call router then rings phones and routes calls based on the information contained within the phone parameters for each defined region. In this manner, one or more land-based phones and/or portable phones may be selectively rung or not rung depending on the self-detected geographical position of one or more portable phones.

Figure 18:
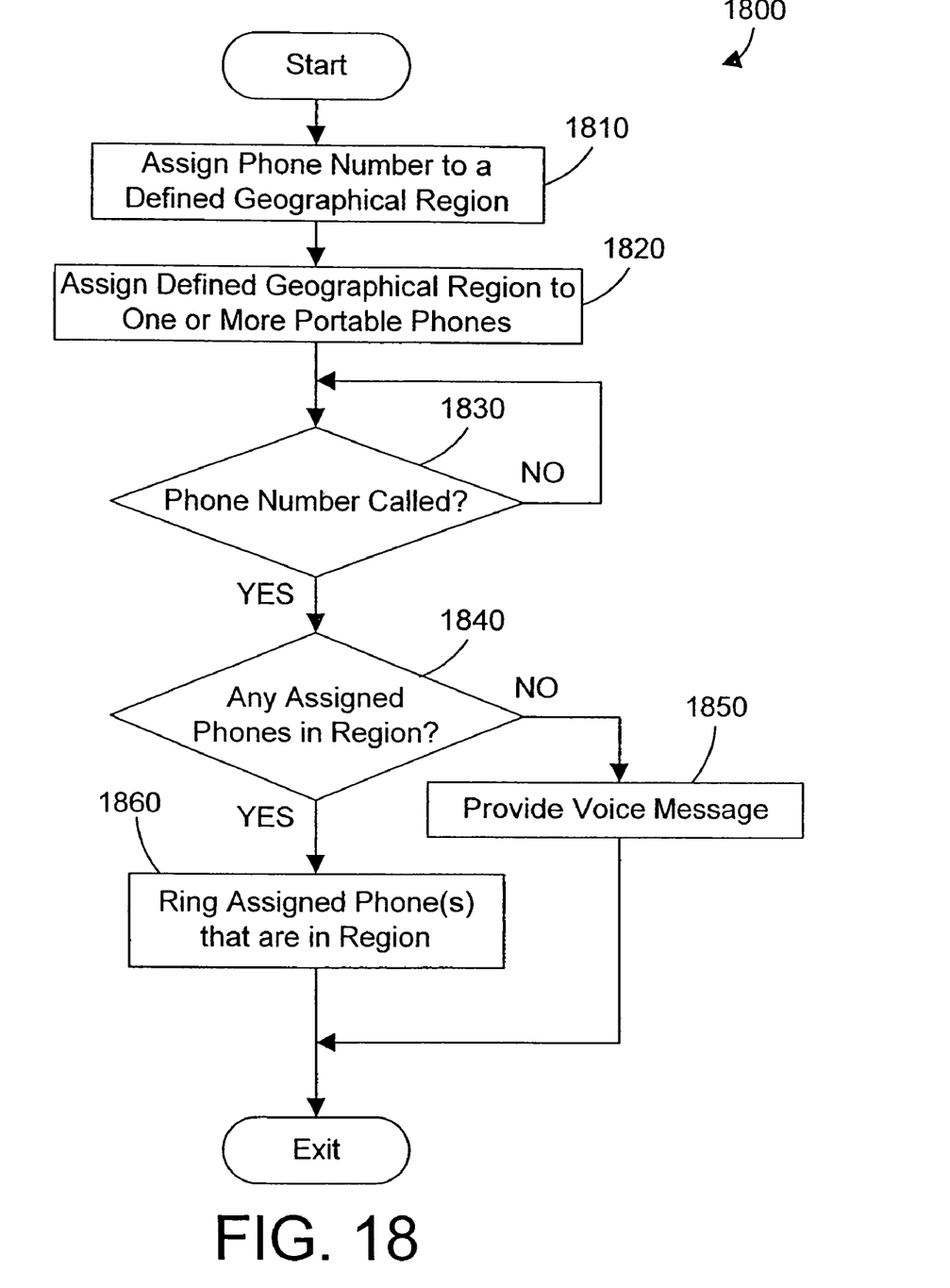
FIG. 18 is a flow diagram of a method for assigning a phone number to a geographical region and assigning one or more phones to the assigned phone number, and for ringing an assigned phone only when the assigned phone is within the defined geographical region.

Referring to FIG. 18, a method 1800 includes the steps for assigning a telephone number to a geographical location, and answering a call based on whether or not there are any assigned phones within that region. First, a phone number is assigned to a defined geographical region (step 1810). Next, one or more portable phones are assigned to the geographical region (step 1820). When the assigned phone number is called (step 1830=YES), method 1800 determines whether there are any assigned phones in the assigned region (step 1840). If so (step 1840=YES), all assigned phones in the assigned region are rung (step 1860), and the first one to answer the call is connected to take the call. If there are no assigned phones in the assigned region (step 1840=NO), a voice message is provided (step 1850) to inform the caller that there are no assigned phones in the region they called. In this manner a caller may be connected to any assigned phone so long as the assigned phone is within the assigned geographical region. If an assigned phone is not within the assigned geographical region, it does not answer the call.

Note that a variation of method 1800 within the scope of the preferred embodiments is to have the voice message of step 1850 provide a voice menu to the caller that allows the caller to press one or more keys on the caller's telephone to connect to an assigned phone that is the closest to the assigned region even though there are no assigned phones in the assigned region. This feature would be very useful in a variety of applications. For a security example where a Security Supervisor needs to have one of his personnel investigate a problem, this feature would allow the Security Supervisor to automatically call a portable phone that is closest to the assigned geographical region in the event that there are no assigned phones in the assigned geographical region.

The present invention provides enhanced functionality for a telephone system by allowing the self-detected position of a portable phone to affect the ringing and routing of calls to one or more land-based or portable phones as the portable phone travels between defined geographical regions. This changing function is programmable by the user, and causes the phone system to automatically operate in a pre-programmed way as a portable phone enters and exits defined geographical regions. The result is a telephone system that is much more user-friendly, adapting itself to the programmed needs of the user automatically as a portable phone changes location.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A method for selectively ringing or not ringing a second phone when a call is placed to a portable phone, the method comprising the steps of:
  (A) the portable phone using an internal position detector to detect its geographical position;
  (B) defining at least one geographical region;
  (C) defining phone parameters that determine how a call is rung and routed for each defined geographical region;
  (D) receiving the position of the portable phone from the position detector;
  (E) determining from the received position of the portable phone whether the portable phone enters or exits a defined geographical region;
  (F) updating phone parameters for a geographical region when the portable phone enters the geographical region;
  (G) updating phone parameters for a geographical region when the portable phone exits the geographical region; and
  (H) ringing and routing a telephone call according to the phone parameters for a defined geographical region;
  wherein steps (A), (B), (D) and (E) are performed by the portable phone, and wherein steps (C), (F), (G) and (H) are performed by a telephone network coupled to the portable phone.

2. A telephone system comprising:
  (A) a portable phone that includes:
    (A1) a position detector that detects geographical position of the portable phone;
    (A2) at least one named geographical region;
    (A3) a message mechanism that sends a message to a telephone network when the portable phone enters a named geographical region and sends a message to the telephone network when the portable phone exits a named geographical region;
  (B) a telephone network that includes:
    (B1) phone parameters defined for each named geographical region that determine how a call is rung and routed within the named geographical region;
    (B2) a phone parameters update mechanism that updates phone parameters for a named geographical region when a message is received from the message mechanism in the portable phone indicating that the portable phone has entered the named geographical region, and that updates phone parameters for a named geographical region when a message is received form the message mechanism in the portable phone indicating that the portable phone has exited the named geographical region; and
    (B3) a call router that routes a telephone call according to the phone parameters for a named geographical region.

* * * * *